Figure 1:
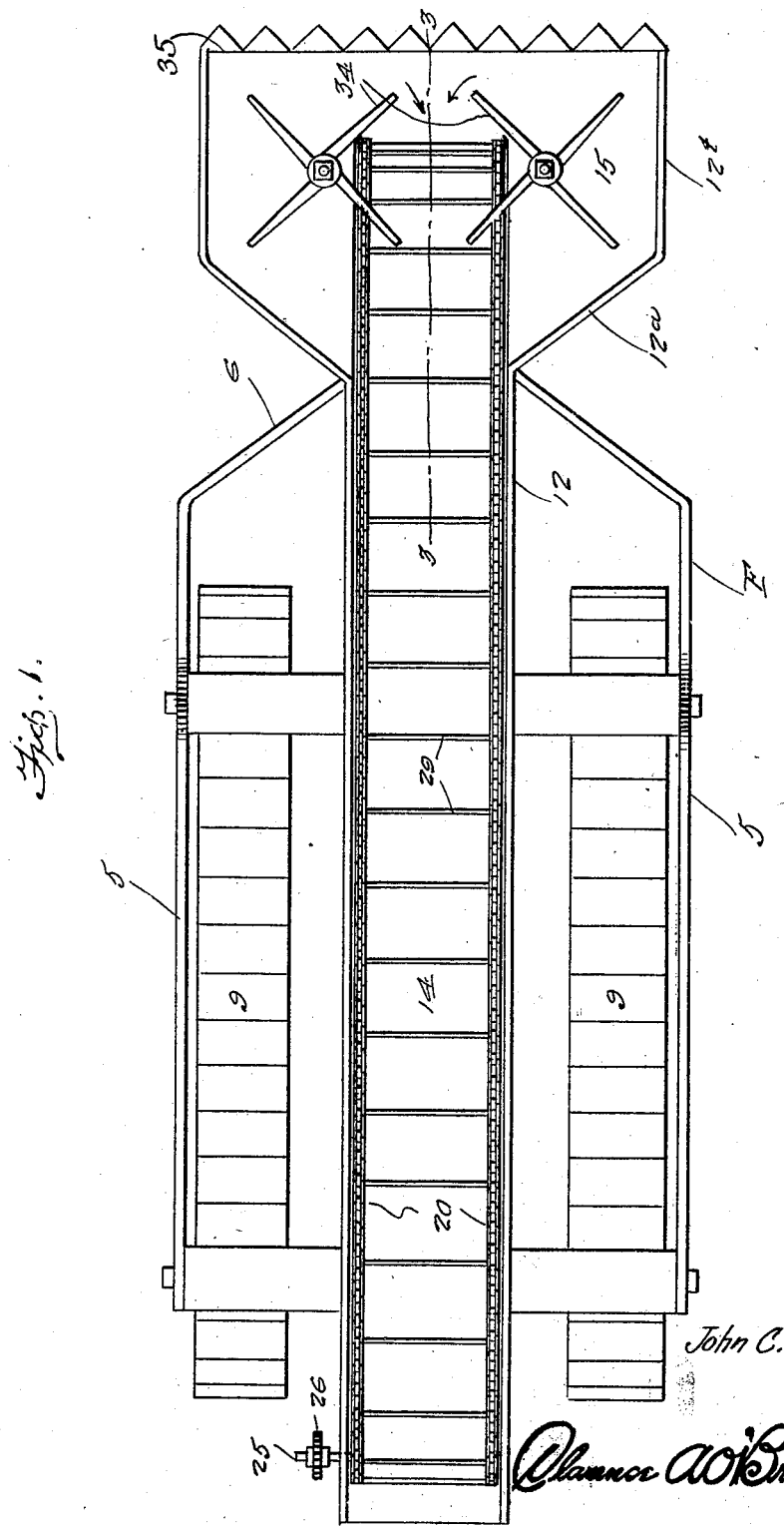

June 7, 1932.  J. C. McDERMOTT  1,862,230
LOADER
Filed Nov. 5, 1929   4 Sheets-Sheet 1

Inventor
John C. McDermott

Clarence A. O'Brien
Attorney

June 7, 1932.  J. C. McDERMOTT  1,862,230
LOADER
Filed Nov. 5, 1929   4 Sheets-Sheet 3

Inventor
John C. McDermott

By Clarence A. O'Brien
Attorney

June 7, 1932.  J. C. McDERMOTT  1,862,230
LOADER
Filed Nov. 5, 1929   4 Sheets-Sheet 4
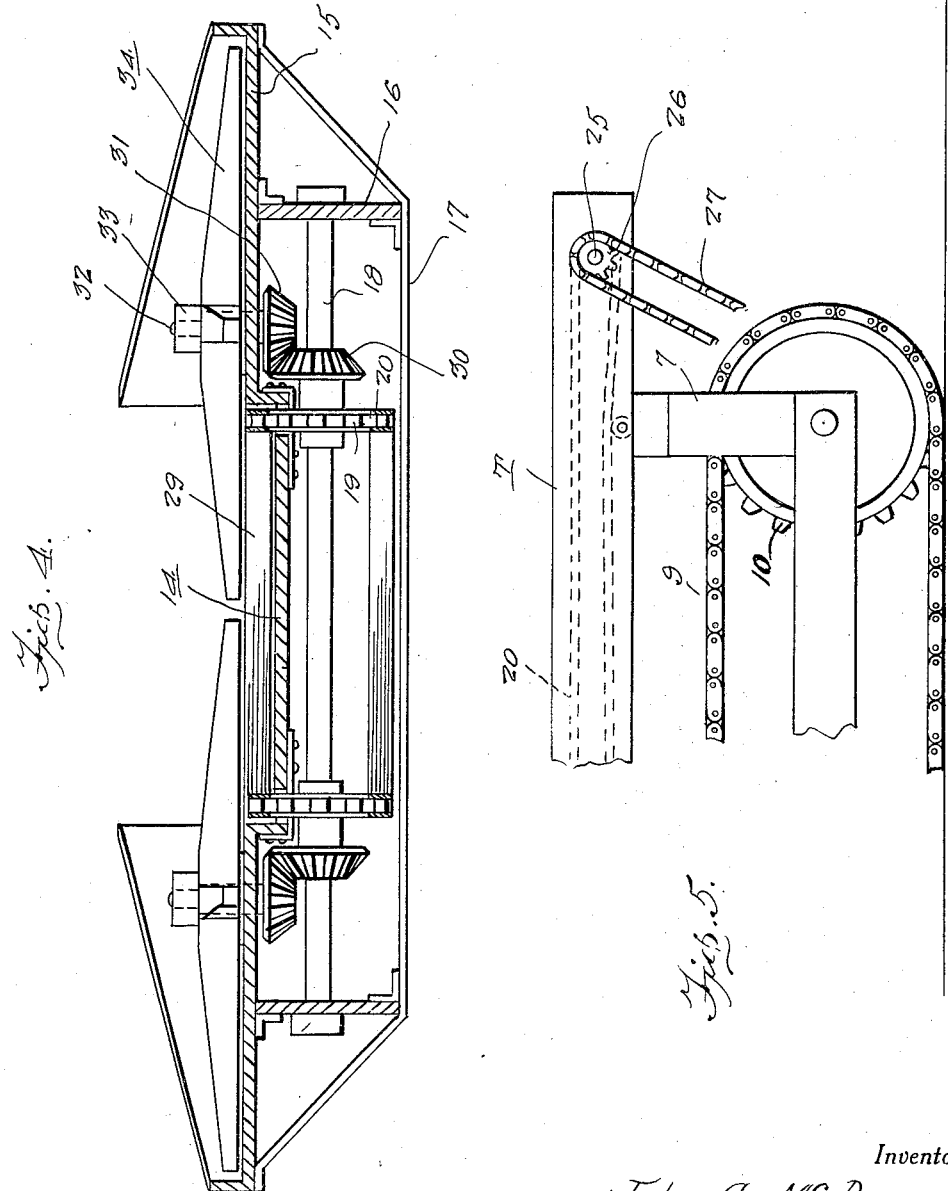
Inventor
John C. McDermott
By Clarence A. O'Brien
Attorney Patented June 7, 1932

1,862,230

UNITED STATES PATENT OFFICE

JOHN C. McDERMOTT, OF INDIANA, PENNSYLVANIA

LOADER

Application filed November 5, 1929. Serial No. 404,933.

The present invention relates to a loader for coal, sand, gravel, and the like and has for its prime object to provide a trough with an endless conveyor therein and a gathering mechanism at the bottom end of the trough for conveying the coal or the like onto the endless conveyor without the necessity of shovelling by hand.

A still further very important object of the invention resides in the provision of a loader of this nature which is simple in its construction, strong and durable, comparatively inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
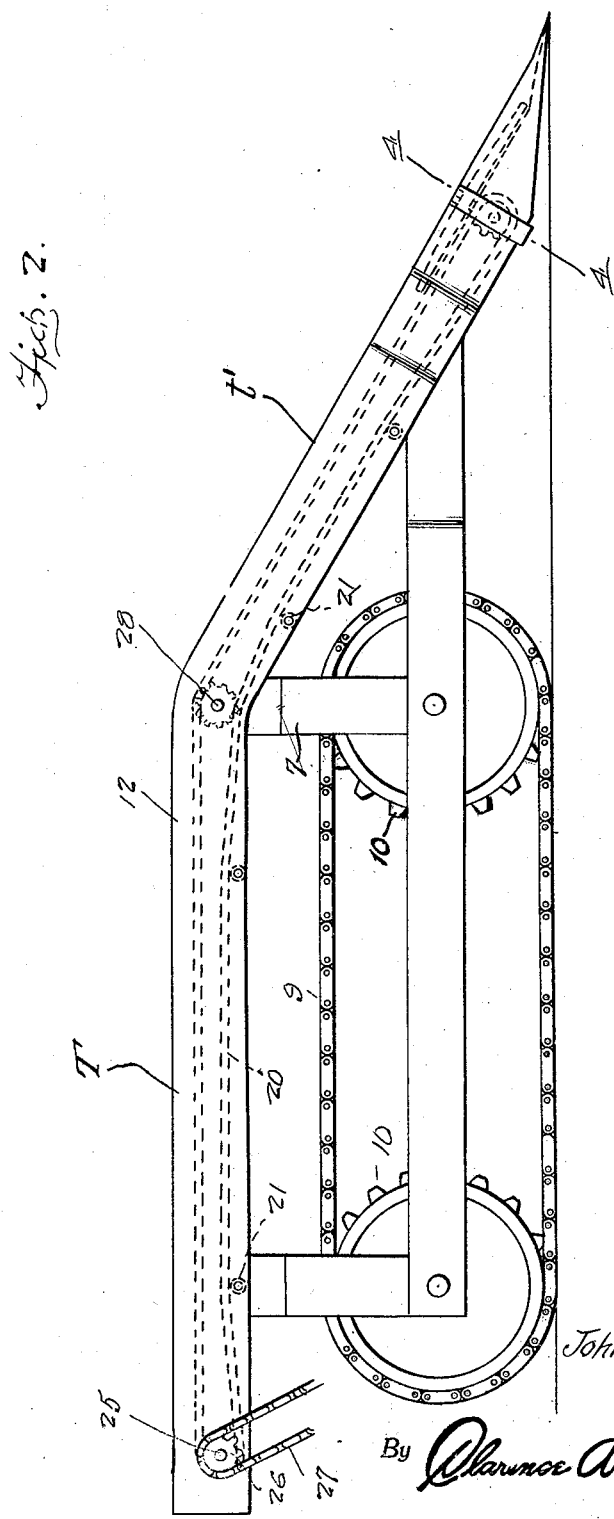
Figure 3:
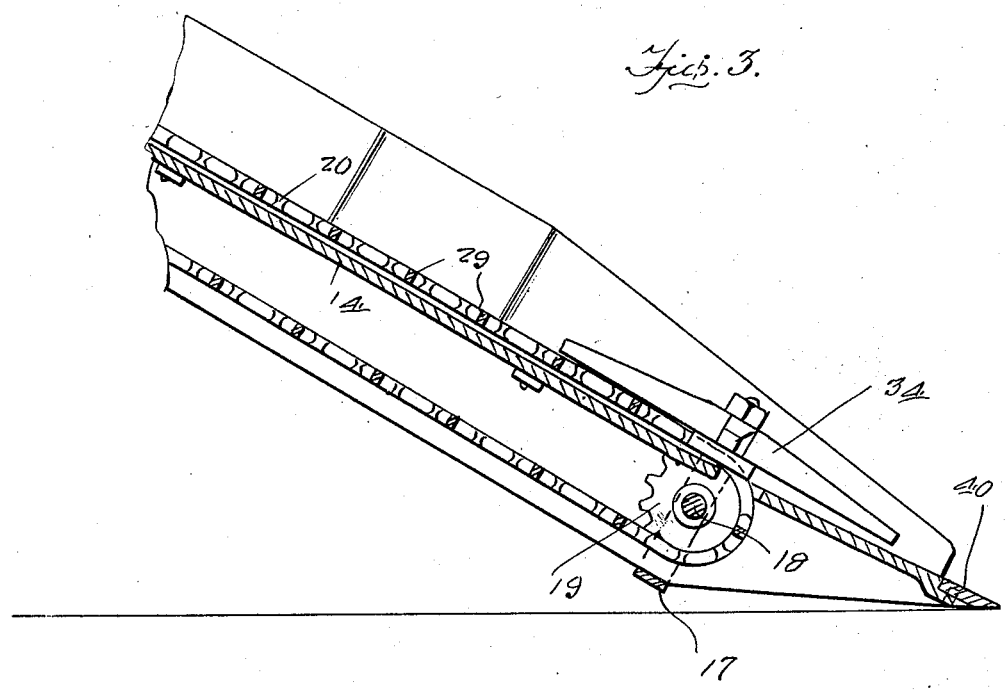
Figure 6:
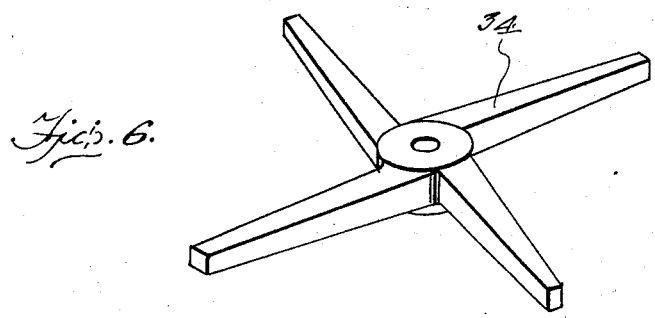

In the drawings:

Figure 1 is a top plan view of the loader embodying the features of my invention, Figure 2 is a side elevation thereof, Figure 3 is an enlarged detail section taken substantially on the line 3—3 of Figure 1, Figure 4 is a vertical transverse section taken substantially in the line 4—4 of Figure 2, Figure 5 is a detail side elevation of the rear end of the loader opposite to that shown in Figure 2, and Figure 6 is a perspective view of one of the beaters.

Referring to the drawings in detail it will be seen that the letter F denotes a frame comprising a pair of side bars 5 which converge inwardly and forwardly at 6 at their forward ends. Brackets 7 of substantially inverted U-shape rise from the frame and support a trough T. The frame F is mounted on endless trackways 9 trained about sprockets 10.

The trough T comprises a horizontal portion and a downwardly and forwardly inclined portion t'. The trough is made up of side walls 12 with a platform 14 mounted therebetween.

The lower ends of the side walls 12 diverge outwardly and forwardly in extensions 12a merge into forwardly directed spaced parallel extensions 12b. A platform 15 is mounted between the extensions 12a and 12b at a slightly higher level than the adjacent portions of the platform 14.

Plates 16 depend from the platform 15 inwardly of the side edges thereof and are supported by brace strap 17. A shaft 18 is journaled in the plates 16 and has sprockets 19 thereon over which are trained endless chains 20 the upper runs of which extend over the platform 14 while the lower runs extend under the platform 15 and suitable idlers are associated therewith.

These chains are trained over sprockets on a shaft 25 having additional sprockets 26 thereon with power operating chains 27 associated therewith. At the juncture of the horizontal with the inclined portion of the trough there is a shaft 28 with sprockets thereon over which the chains are trained.

Cross slats 29 are mounted between the chains 20 and move along the top surface of the platform 14 for moving coal up the inclined portion of the trough and rearwardly along the horizontal portion thereof.

Beveled gears 30 are mounted on the shaft 18 and mesh with beveled gears 31 on vertical shafts 32 journaled through the platform 15 one to each side of the platform 14 and hubs 33 are fixed thereto and have blades 34 extending therefrom to form beaters and these beaters rotate in opposite directions as is indicated by the arrows in Figure 1 so as to gather coal or the like on to the lower portion of the platform 14 so that slats may urge the coal upwardly and rearwardly as will be quite apparent.

On the forward edge of the platform 15 there is mounted a toothed blade 35 so that the same may be forced into a pile of coal, sand, gravel or the like in order that the two beaters may engage therewith for gathering the material onto the endless conveyor structure.

It is thought that the construction, operation, utility and advantages of this invention will now be quite apparent to those skilled in this art without a more detailed description thereof.

The present embodiment of the invention has been disclosed in considerable detail since in actual practice it attains the features of advantage enumerated as desirable in the statement of the invention and the above description.

It will be apparent that changes in the details of construction, and in the combination and arrangement of parts may be resorted to without departing from the spirit or scope of this invention as hereinafter claimed or sacrificing any of its advantages.

Having thus described my invention, what I claim as new is:

In a loader, the combination comprising a frame, said frame including longitudinal side members and substantially inverted U-shaped cross members having their ends secured to the side members, supporting wheels journaled between the ends of the cross members, a trough mounted longitudinally on the cross members and having a downwardly inclined forward end portion terminating in a flared mouth portion for the reception of the material to be loaded, the forward end portions of the side members converging toward the inclined portion of the trough and secured thereto at the point of mergence of the mouth therewith, and a conveyor operable in the trough and the mouth portion.

In testimony whereof I affix my signature.

JOHN C. McDERMOTT.